Oct. 11, 1927.
R. N. MURPHY
1,644,941
SANITARY TRAP FITTING
Filed March 24, 1925
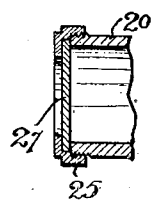
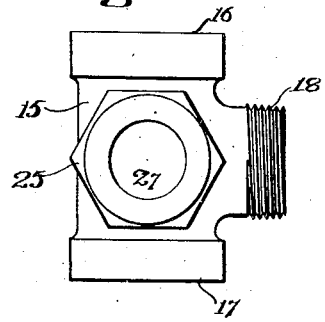
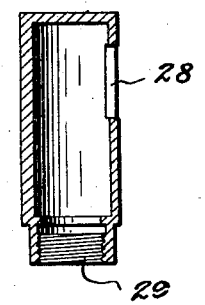
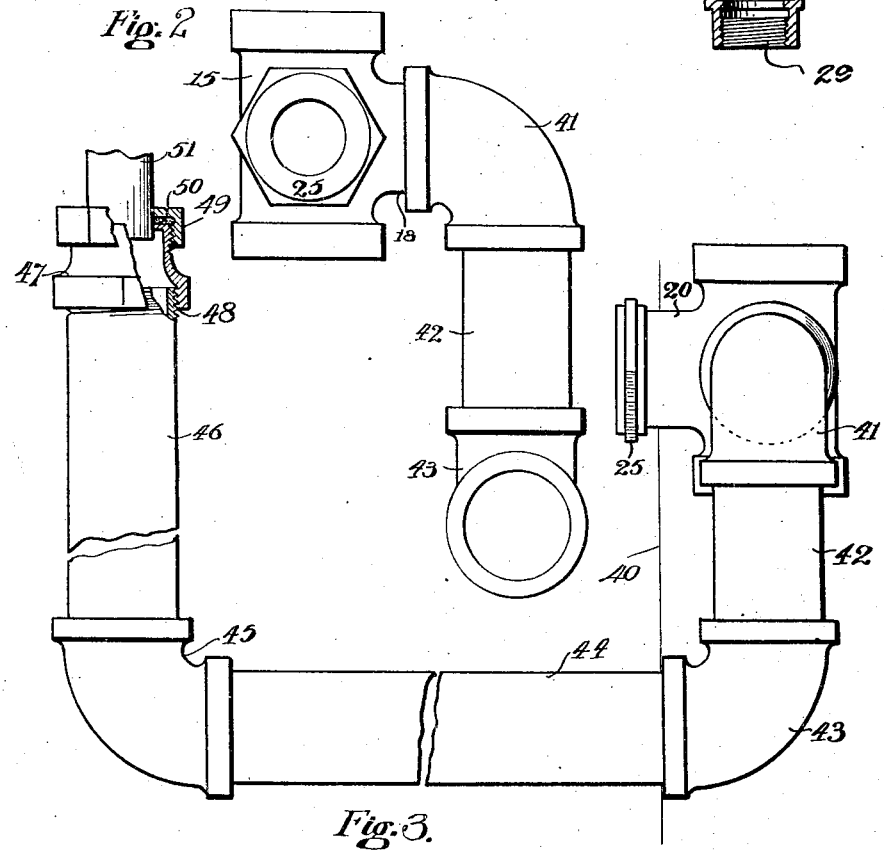
INVENTOR
R. N. Murphy.
Per Carson&Carson
Attorneys.

Patented Oct. 11, 1927.

1,644,941

UNITED STATES PATENT OFFICE.

ROBERT NICHOLAS MURPHY, OF OTTAWA, ONTARIO, CANADA, ASSIGNOR OF TWENTY-EIGHT AND THREE-FOURTHS PER CENT TO JAMES S. WILSON AND ELEVEN AND ONE-FOURTH PER CENT TO HARRY R. MEREDITH, BOTH OF OTTAWA, CANADA.

SANITARY-TRAP FITTING.

Application filed March 24, 1925. Serial No. 17,875.

My invention relates to sanitary trap fittings intended to be used in connection with basins, sinks and the like and more particularly to that type known as a wall type trap.

The main object of my invention is to provide an improved trap fitting that will enable the trap, vent and waste pipe to be flushed without unnecessary dismantling of the trap.

Another object of my invention is to provide a fitting which will permit setting the greater part of the trap within the walls, thereby permitting the use of standard piping and fittings in its construction.

Other objects and advantages will become apparent by following the following specification with its appended drawings, in which Figure 1 is a front elevation;

Figure 2 is a front elevation showing part of a trap;

Figure 3 is a corresponding side view thereof showing the adaptability of standard fittings to form the trap;

Figure 4 is a sectional view of the flushing plug, and

Figure 5 shows the means of closing the fitting when the flushing means are not in use.

Similar numerals refer to similar corresponding parts throughout the different views.

The fitting consists of a body 15 resembling an ordinary T inasmuch as it has three connections, there being two female threaded connections and one male threaded connection, designated by numerals 16, 17 and 18 respectively. A fourth connection 20, arranged perpendicular to the passage formed by connections 16 and 17, is intended to receive a hollow flushing plug 21 which, when inserted in the fitting, will prevent communication between connections 16, 17 and 18. It will be seen that the plug 21 is held in place by a nut 25 having an aperture to accommodate the end of the plug 21. As the plug is in position in the fitting only when it is actually necessary to flush the system, means to close the aperture is provided, which means may consist of a lead disc 27 adapted to be clamped between the fitting and nut 25, as clearly shown in Figure 5.

The flushing plug 21 has an aperture 28 so positioned so as to be registrable with vent outlet 16, waste outlet 17 and trap connection 18 selectively by rotation of the plug. The plug 21 also has one end opened as shown in Figure 4, this opening being provided with threads 29 suitable to receive the end of a service hose.

If, at any time, it becomes necessary to flush the system, the lead disc 27 will be removed and the plug 21 will be inserted in the fitting and held there by means of the nut 25. A hose connected to the water supply will now be connected to the open end of the plug. After turning on the supply of water, the plug will be turned so as to direct the stream of water through opening 28 to the vent pipe 16, the waste pipe 17 or to the fixture pipe or trap through connection 18.

It will thus be seen that the invention provides means whereby it is unnecessary to dismantle the trap when flushing is required and that part of the trap may be placed inside the wall. Line 40 represents the wall surface. The axis of the waste inlet or trap connection is deflected downwardly into a plane parallel to the axis of outlets 16 and 17, for example, by means of an elbow 41 and nipple 42. The axis of the waste inlet may be again deflected forwardly into a plane parallel to the axis of bore 20 by means of an elbow 43 and nipple 44. The trap is completed by means of an elbow 45 and nipple 46. A special fitting 47 may be provided having a standard thread 48 to fit on the nipple 46 and on the other end of fitting 47 a nut 49 is screwed to hold packing 50 around a tube 51 which is connected to a fixture such as a sink. The fitting 47 is so made that its top aperture may be enlarged in order to receive a tube of larger diameter.

Although I have described a specific form of construction of my invention, it is to be understood that many modifications may be made to suit requirements without departing from the spirit of this invention, as covered by the following claims.

What I claim is:

1. In a fitting of the class described, a waste outlet and a vent outlet having their axes in a straight line, a waste inlet having its axis perpendicular to said outlets, a bore with its axis perpendicular to both of said axes, said bore intended to receive flushing means connecting with said waste inlet, waste outlet and vent, and a neck so shaped as to place the axis of the connection to said waste inlet in the same plane as the axis of said bore.

2. A sanitary trap fitting comprising a body portion providing a vent outlet at one end and a waste outlet at the other, said outlets being co-axial, a branch connection having a bore with its axis at right angles to the axes of said outlets and intended to receive a flushing plug, and a waste inlet communicating with the body portion at right angles to the axes of said bore and said outlets and deflected downwardly into a plane parallel to the axes of said outlets and again deflected forwardly into a plane parallel to the axis of said bore.

In testimony whereof I have hereunto set my signature this 28th day of February, 1925.

R. N. MURPHY.